United States Patent
Wei (10) Patent No.: US 9,445,363 B2
(45) Date of Patent: Sep. 13, 2016

(54) METHOD OF HANDLING TRANSMISSION CONFIGURATION OF A COMMUNICATION DEVICE AND RELATED COMMUNICATION DEVICE

(75) Inventor: Hung-Yu Wei, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 71 days.

(21) Appl. No.: 13/594,885

(22) Filed: Aug. 27, 2012

(65) Prior Publication Data

US 2013/0208586 A1      Aug. 15, 2013

Related U.S. Application Data

(60) Provisional application No. 61/598,915, filed on Feb. 15, 2012.

(51) Int. Cl.
*H04W 28/02* (2009.01)
*H04W 52/02* (2009.01)
*H04W 72/12* (2009.01)

(52) U.S. Cl.
CPC ..... *H04W 52/0216* (2013.01); *H04W 72/1284* (2013.01)

(58) Field of Classification Search
CPC ... H04L 47/10; H04L 47/15; H04L 47/2441; H04L 12/5695; H04Q 11/0478
USPC ................. 370/230, 235, 337, 321
See application file for complete search history.

(56) References Cited

U.S. PATENT DOCUMENTS

| | | | |
|---|---|---|---|
| 6,606,301 B1* | 8/2003 | Muller et al. | 370/230 |
| 7,000,031 B2* | 2/2006 | Fischer et al. | 709/248 |
| 7,664,130 B2* | 2/2010 | Sakoda | H04L 47/10 370/442 |
| 7,869,838 B2* | 1/2011 | Carballo | 455/574 |
| 8,116,311 B1* | 2/2012 | Kunz et al. | 370/389 |
| 8,488,485 B2* | 7/2013 | Carlsson et al. | 370/252 |
| 2002/0031143 A1* | 3/2002 | Bossemeyer et al. | 370/466 |
| 2004/0057378 A1* | 3/2004 | Gronberg | 370/230 |
| 2004/0120320 A1* | 6/2004 | Farahmand | H04Q 11/0005 370/395.4 |
| 2006/0013137 A1* | 1/2006 | Ni | 370/235 |
| 2007/0058649 A1* | 3/2007 | Kytomaa et al. | 370/412 |
| 2008/0107028 A1* | 5/2008 | Wan | 370/235 |
| 2008/0115194 A1* | 5/2008 | Apostolopoulos | 726/4 |
| 2008/0242370 A1* | 10/2008 | Lando et al. | 455/574 |

(Continued)

FOREIGN PATENT DOCUMENTS

WO    2011098661 A1    8/2011

OTHER PUBLICATIONS

3GPP TS 25.214 Version 6.8.0 (Mar. 2006).*

(Continued)

*Primary Examiner* — Mark Rinehart
*Assistant Examiner* — Peter Solinsky
(74) *Attorney, Agent, or Firm* — Winston Hsu; Scott Margo (57) ABSTRACT

A method of handling transmission configuration of a communication device in a wireless communication system is disclosed. The method is utilized in the communication device, and comprises determining traffic information of a plurality of packets which are transmitted between the communication device and a network of the wireless communication system according to the transmission configuration; and transmitting the traffic information to the network, for the network to configure the transmission configuration according to the traffic information.

20 Claims, 4 Drawing Sheets

(56) References Cited

U.S. PATENT DOCUMENTS

| | | | |
|---|---|---|---|
| 2008/0298382 A1* | 12/2008 | Galli et al. | 370/438 |
| 2009/0002378 A1* | 1/2009 | Kondo | 345/506 |
| 2009/0154568 A1* | 6/2009 | Chuang et al. | 375/240.25 |
| 2010/0110892 A1* | 5/2010 | Lai et al. | 370/235 |
| 2010/0329146 A1* | 12/2010 | Yoshida et al. | 370/253 |
| 2011/0032839 A1* | 2/2011 | Chen et al. | 370/252 |
| 2011/0075588 A1 | 3/2011 | Carlsson | |
| 2011/0149966 A1* | 6/2011 | Pope et al. | 370/392 |
| 2011/0237231 A1* | 9/2011 | Horneman | H04W 76/048 455/414.1 |
| 2012/0281619 A1* | 11/2012 | Tao et al. | 370/328 |
| 2013/0003636 A1* | 1/2013 | Proctor, Jr. | 370/311 |
| 2013/0114434 A1* | 5/2013 | Muruganathan et al. | 370/252 |
| 2013/0132503 A1* | 5/2013 | Wang et al. | 709/213 |
| 2013/0148889 A1* | 6/2013 | Tu et al. | 382/166 |
| 2013/0252659 A1* | 9/2013 | Jia et al. | 455/522 |
| 2013/0301616 A1* | 11/2013 | Yano et al. | 370/331 |
| 2013/0303199 A1* | 11/2013 | Siomina | H04W 64/00 455/456.5 |
| 2013/0326083 A1* | 12/2013 | Boucher et al. | 709/232 |
| 2013/0343317 A1* | 12/2013 | Etemad et al. | 370/329 |

OTHER PUBLICATIONS

3GPP TS 25.321 version 3.6.0 Release 1999.*
Falaki, Hossein; Mahajan, Ratul; Kandula, Srikanth; Lymberopoulos, Dimitrios; Govindan, Ramesh; Estrin, Deborah; Diversity in Smartphone Usage, MobiSys'10, Jun. 15-18, 2010, San Francisco, California, USA. Copyright 2010 ACM 978-1-60558-985-5/10/06 . . . $10.00.*
3GPP TSG-RAN WG2 #77, Tdoc R2-120435, Feb. 10, 2012.*
Title: Work Item Proposed Update for LTE RAN Enhancements for Diverse Data Applications, 3GPP TSG RAN Meeting #53 RP-111372 Fukuoka, Japan Sep. 13-16, 2011 revision of RP-111320.
Ericsson et al., UE-supported DRX parameter settings, 3GPP TSG-RAN WG2 #77, Tdoc R2-120435, Feb. 6-10, 2012, P1-P3, XP050565392, Dresden, Germany.
Mediatek, Discussion on Management of Diverse Data Applications, 3GPP TSG-RAN2 #73bis meeting, Tdoc R2-112037, Apr. 11-15, 2011, pp. 1-3, XP050605744, Shanghai, PROC.
ETSI MCC, Report of 3GPP TSG RAN WG2 meeting #77, TSG-RAN Working Group 2 meeting #77bis, R2-121973, Mar. 26-30, 2012, pp. 1-169, XP050605813, Jeju, Korea.
Samsung, Assistance information from UE to eNB for eDDA, 3GPP TSG-RAN WG2 #77Bis, R2-121465, Mar. 26-30, 2012, XP050605996, Jeju, Korea.

* cited by examiner

METHOD OF HANDLING TRANSMISSION CONFIGURATION OF A COMMUNICATION DEVICE AND RELATED COMMUNICATION DEVICE

CROSS REFERENCE TO RELATED APPLICATIONS

This application claims the benefit of U.S. Provisional Application No. 61/598,915, filed on Feb. 15, 2012 and entitled "Feedback Mechanism and Adaptation Mechanism for Efficient Smartphone Communications", the contents of which are incorporated herein in their entirety.

BACKGROUND OF THE INVENTION

1. Field of the Invention

The present invention relates to a method used in a wireless communication system and related communication device, and more particularly, to a method of handling transmission configuration of a communication device and related communication device.

2. Description of the Prior Art

With development of communication device manufacturers, operators and service providers, a communication device (e.g., smartphone) is capable of executing various applications which interact (i.e., transmits/receives packets) with a network of a wireless communication system. Traffic created by an application can be determined according to a type of the application and/or whether the application is in an active mode (i.e., operated by a user) or in an idle mode (i.e., executed in background).

For example, the communication device may need to transmit (or receive) packets with large sizes to (or from) the network infrequently (i.e., bursty) for an application in the active mode. That is, even though load (i.e., average data rate) of traffic of the application is heavy, the communication device only needs to process (i.e., transmits/receives) the traffic in a few time intervals since the traffic is only created in these time intervals. Examples of the application can be a streaming application, a file transfer application, or a web-browsing application.

On the other hand, the communication device may need to transmit (or receive) packets with small sizes to (or from) the network frequently (i.e., intermittently) for an application in the active mode. That is, even though load (i.e., average data rate) of traffic of the application is light, the communication device needs to process (i.e., transmits/receives) the traffic constantly since the traffic is widely dispersed in time. Examples of the application can be a social network application, a weather application, a stock application, or a messenger application. Furthermore, even if these applications are in the idle mode, frequent updates (e.g., status updates) are usually required and the traffics are still created.

The traffics created by the applications become especially complicated when different types of the applications are executed in the communication device, and some of the applications are in the active mode while the other applications are in the idle mode. Therefore, it is difficult to manage power consumption when the traffics are created by various applications in various modes. As a result, how to manage the power consumption effectively when the traffics are complicated is a topic to be discussed.

SUMMARY OF THE INVENTION

The present invention therefore provides a method and related communication device for handling transmission configuration of a communication device in a wireless communication system to solve the abovementioned problem.

A method of handling transmission configuration of a communication device in a wireless communication system is disclosed. The method is utilized in the communication device, and comprises determining traffic information of a plurality of packets which are transmitted between the communication device and a network of the wireless communication system according to the transmission configuration; and transmitting the traffic information to the network, for the network to configure the transmission configuration according to the traffic information.

A communication device in a wireless communication system for handling transmission configuration of the communication device is disclosed. The communication device comprises means for determining traffic information of a plurality of packets which are transmitted between the communication device and a network of the wireless communication system according to the transmission configuration; and means for transmitting the traffic information to the network, for the network to configure the transmission configuration according to the traffic information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
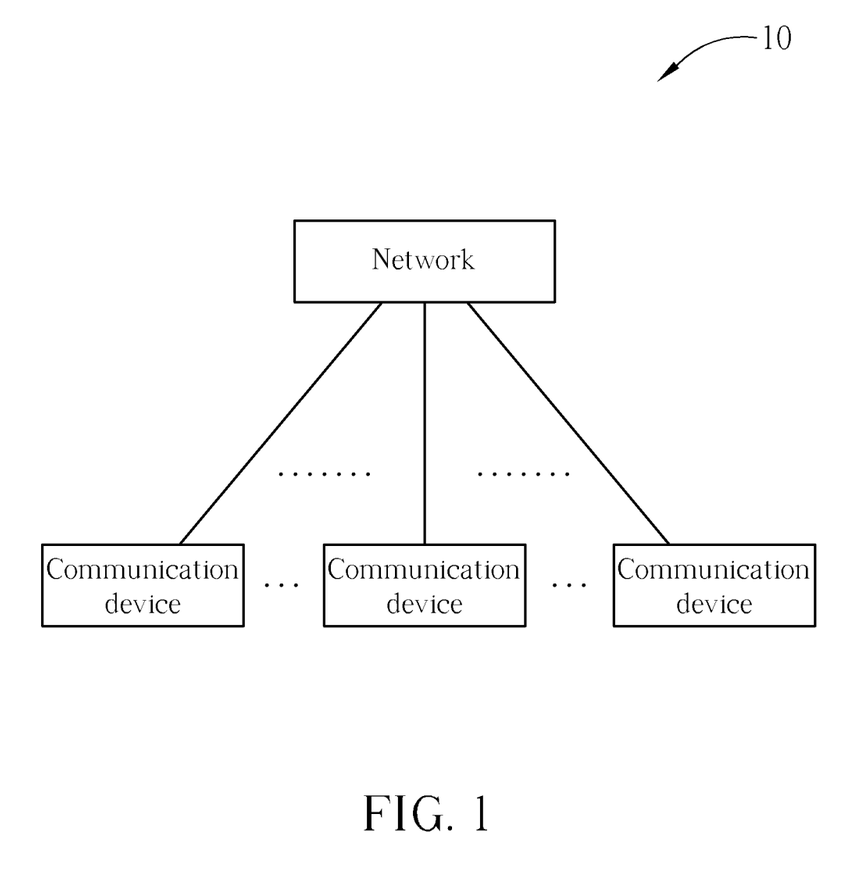
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be mobile phones, laptops, tablet computers, electronic books, portable computer systems, and machine-type communication (MTC) devices. The communication devices can also be referred to mobile stations (MSs) or user equipments (UEs) in the UMTS, the LTE system or the LTE-A system. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
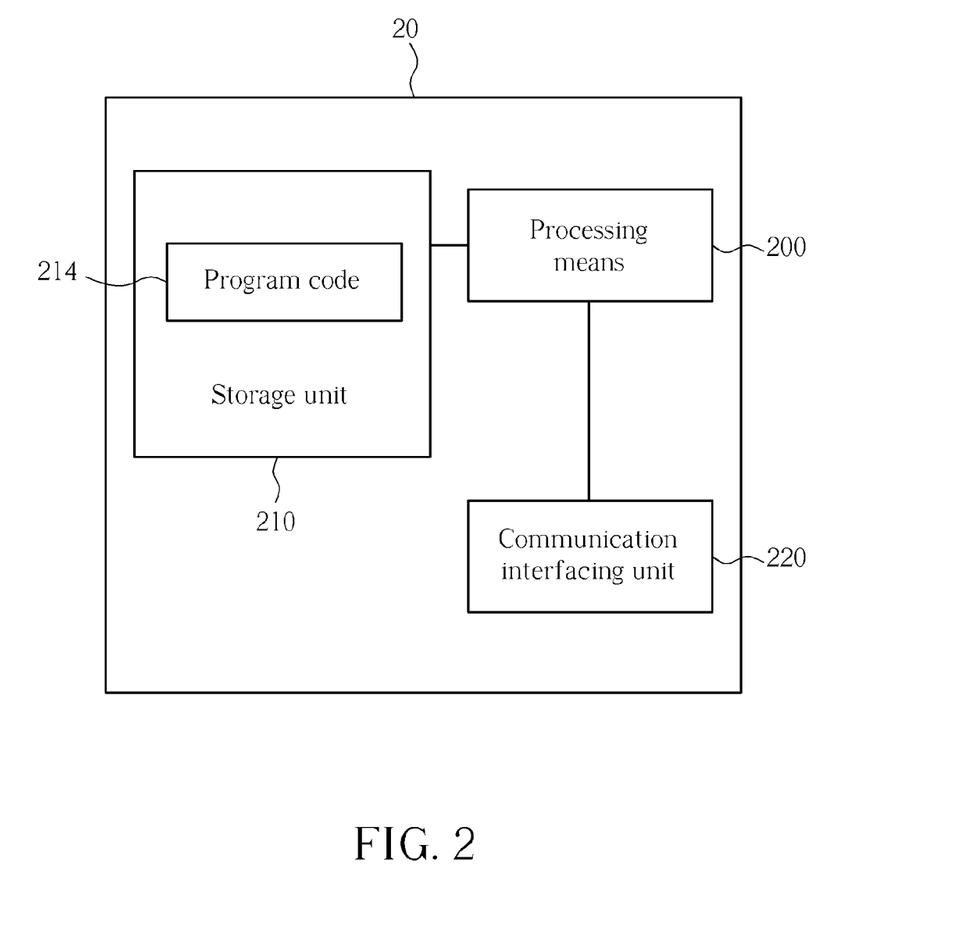
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals according to processing results of the processing means 200.

Figure 3:
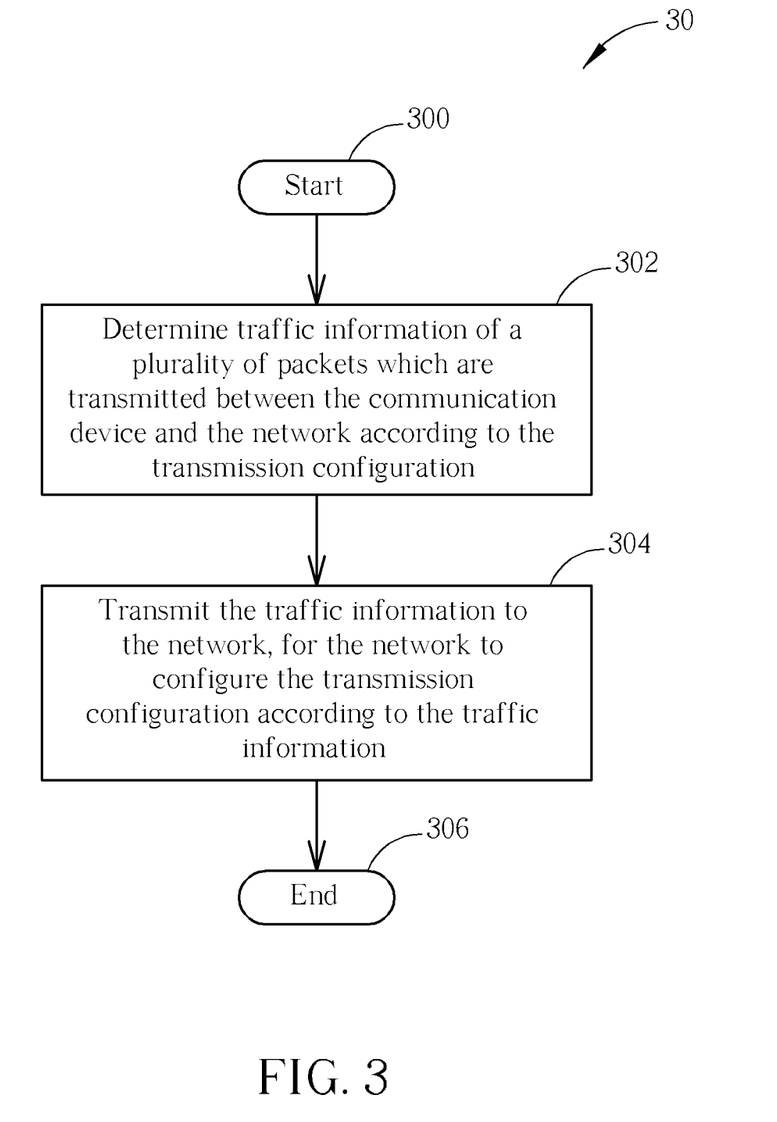
FIG. 3 is a flowchart of a process according to an example of the present invention.

Please refer to FIG. 3, which is a flowchart of a process 30 according to an example of the present invention. The process 30 is utilized in a communication device shown in FIG. 1, for handling transmission configuration of the communication device (i.e., the transmission configuration corresponding to the communication device). The process 30 may be compiled into the program code 214 and includes the following steps:

Step 300: Start.

Step 302: Determine traffic information of a plurality of packets which are transmitted between the communication device and the network according to the transmission configuration.

Step 304: Transmit the traffic information to the network, for the network to configure the transmission configuration according to the traffic information.

Step 306: End.

According to the process 30, the communication device determines traffic information of a plurality of packets which are transmitted between the communication device and the network according to the transmission configuration. Then, the communication device transmits (i.e., feeds back or reports) the traffic information to the network, for the network to configure (e.g., adjust, modify and/or control) the transmission configuration according to the traffic information. In other words, the communication device can record the traffic information which can include an amount and timing of the packets transmitted by the communication device, the network or both the communication device and the network, wherein the packets may be generated by applications in an active mode and/or an idle mode. Then, the traffic information is transmitted to the network, such that the network can configure the transmission configuration according to the traffic information. For example, if the traffic information indicates that most of the packets are transmitted in a first time period and rest of the packets are transmitted in a second time period, the network can configure the transmission configuration such that the communication device spends more resource (e.g., power) and less resource in the first time period and the second period, respectively. Thus, power consumption of the communication device and signaling overhead caused when transmitting the packets can be reduced.

Please note that, a spirit of the process 30 is that the communication device transmits the traffic information to the network such that the network can configure the transmission configuration according to the traffic information to reduce the power consumption of the communication device and the signaling overhead. Realization of the process 30 is not limited.

Figure 4:
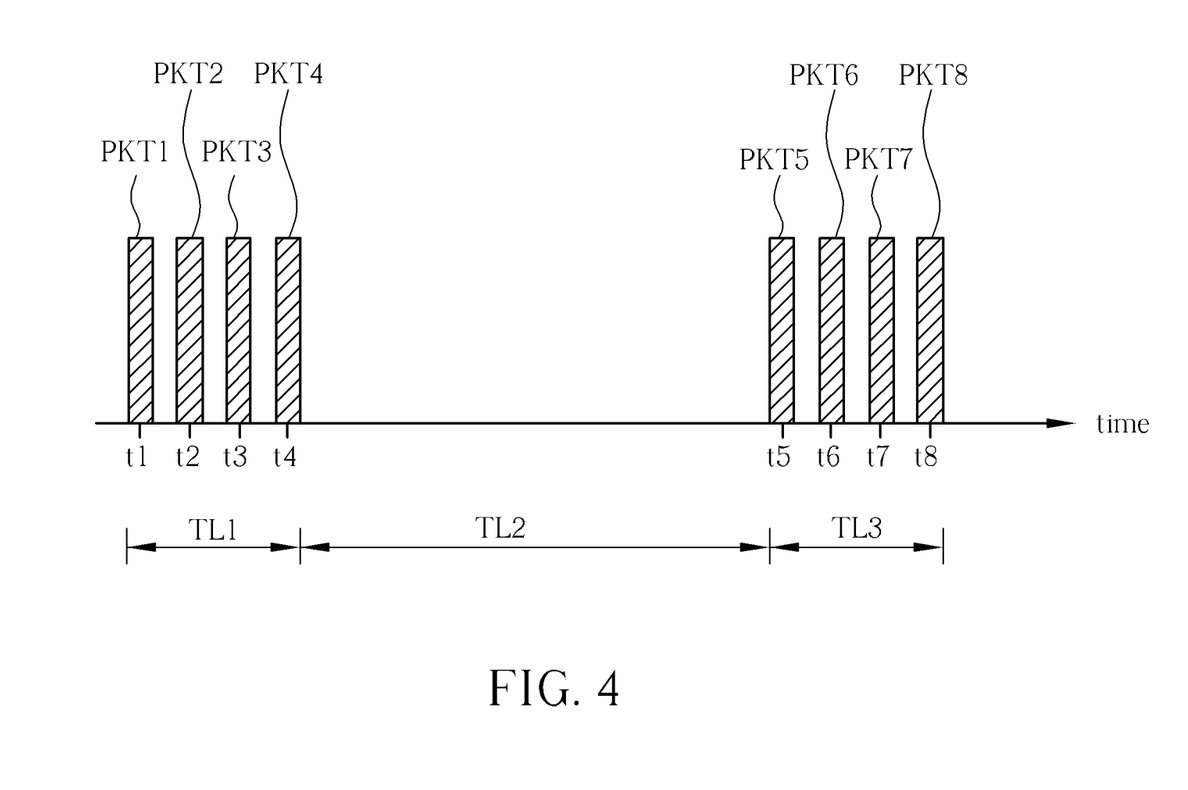
FIG. 4 is a schematic diagram of transmission of packets according to an example of the present invention.

Please refer to FIG. 4, which is a schematic diagram of transmission of packets according to an example of the present invention. A time period considered in FIG. 4 is divided into time intervals TL1-TL3 according to an amount of packets transmitted in the time period. In detail, the time intervals TL1 and TL3 can be considered as busy periods (i.e., active sessions), wherein most of the packets are transmitted. For example, the busy period may be caused due to one or more applications are in the active mode. For ease of illustration, packets PKT1-PKT8 are used for representing the most of the packets transmitted in the time intervals TL1 and TL3, wherein sizes of the packets PKT1-PKT8 are SZ1-SZ8 (e.g., a number of bits/bytes), respectively. More specifically, the packets PKT1-PKT8 are transmitted at time instants t1-t8, respectively, and each of the packets PKT1-PKT8 may be transmitted by the communication device or the network. The time interval TL2 can be considered as an idle period (i.e., idle session), wherein only a few or none of the packets are transmitted, which are not shown for simplicity. For example, the idle period may be caused due to most or all of the applications are in the idle mode.

Please note that, FIG. 4 is simply used for illustrating following examples according to the present invention, and a transmission pattern (e.g., amount and/or time instant) of the packets are not limited to that shown in FIG. 4. Further, a criterion according to which the time period is divided (i.e., how the time intervals are determined) is not limited to the amount of the packets. For example, the time intervals may also be determined according to the power consumption of the communication device, a user preference, a configuration set by a manufacturer of the communication device, a network configuration of the network, or any combination of the abovementioned description.

In detail, the traffic information transmitted by the communication device can include timing information according to which the packets are transmitted (e.g., by the communication device, the network, or both the communication device and the network). For example, the timing information can be time instants at which the packets are transmitted. That is, the time instants t1-t8 are transmitted to the network, such that the network can configure the transmission configuration according to the time instants t1-t8. Alternatively, the timing information can be information related to at least one time interval during which most of the packets are transmitted. For example, the information can be at least one length of the at least one time interval (i.e., rough), at least one (start, end) pair of the at least one time interval (i.e., precise), etc. That is, the information can be the lengths (t4−t1) and (t8−t5), or the pairs (t1, t4) and (t5, t8). In short, when differences between the sizes SZ1-SZ8 are small, it may be sufficient for the network to configure the transmission configuration according to the traffic information including only the timing information.

In addition, the timing information could be the periodicity and timing offsets of the time instants. For example, when the traffic pattern in FIG. 4 (or a traffic pattern similar) appears periodically, TL1 (the active session, which is approximately equal to TL3 in the pattern) and TL2 (the idle session) could be reported in the traffic information. For example, when the data packets are sent periodically, Tau= (t2−t1)=(t3−t2)=(t4−t3), which is the interval between the data packets within the active period, could be included in the traffic information.

Besides, the traffic information can include size information which is related to sizes of the packets. For example, the size information can be sizes of the packets (i.e., complete), an average of the sizes of the packets (i.e., summary), etc. That is, the size information can be the sizes SZ1-SZ8, or the average size of the sizes SZ1-SZ8. In short, when the packets are transmitted regularly (e.g., periodically), it may be sufficient for the network to configure the transmission configuration according to the traffic information including only the size information.

Furthermore, the traffic information can include both the timing information and the size information. For example, time-size pairs of the packets PKT1-PKT8 can be transmitted to the network. In detail, the time-size pairs of the packets PKT1-PKT8 can be (t1, SZ1), (t2, SZ2), . . . , (t8, SZ8), which describe the transmission pattern completely. Alternatively, the time-size pairs can be (TL1, SZ1+SZ2+SZ3+SZ4) and (TL3, SZ5+SZ6+SZ7+SZ8), which only describe an amount of bits/bytes transmitted in a corresponding time interval (i.e., the summation of the packet sizes during the corresponding time intervals). As mentioned above, the time intervals TL1 and TL3 can be replaced by the pairs (t1, t4) and (t5, t8), respectively, for precisely indicating the time intervals. Alternatively, the time intervals TL1 and TL3 can be replaced by the pairs (t4−t1) and (t8−t5), respectively, for roughly indicating the time intervals. In short, the network can configure the transmission configuration more accurately according to the traffic information including both the timing information and the size information. However, more signaling overhead may be caused when transmitting more information.

Please note that, when transmitting the traffic information, the communication device could only transmit part of the traffic information, to reduce the signaling overhead. In detail, the communication device can perform a truncation on the traffic information, before transmitting the traffic information. For example, if the packet sizes SZ1-SZ4 are much larger than the packet sizes SZ5-SZ8, transmissions of the packets PKT5-PKT8 are less important than transmissions of the packets PKT1-PKT4. The communication device can only transmit the traffic information related to the packets PKT1-PKT4 or the time interval TL1, to reduce the signaling overhead. Besides, the communication device can perform a quantization on the traffic information before transmitting the traffic information, to reduce the signaling overhead. That is, the communication device can transmit an approximate value of the traffic information instead of transmitting the traffic information exactly. For example, if the time instant t1 is AM 6:32:25, the communication device may simply use AM 6:00 or AM 6:30, or an approximate value of AM 6:32:25 which can be described by using fewer bits. In another example, if the packet size SZ1 is 2145 bytes, the communication device may simply use 2000 bytes, or 2048 bytes which is 2^11 and can be described by using fewer bits. Furthermore, the communication device can perform both the truncation and the quantization on the traffic information to greatly reduce the signaling overhead. That is, the communication device chooses part of the traffic information, performs the quantization on the part of the traffic information, and transmits the quantized traffic information to the network.

When the signaling overhead is an important consideration, the communication device can even transmit an index corresponding to the traffic information to the network, to further reduce the signaling overhead. That is, the communication device determines the index according to the traffic information, and then transmits the index to the network, for indicating one of several types of the traffic information to the network. Then, the network can determine the transmission configuration according to the index. Therefore, according to the abovementioned description, tradeoff can be made between accuracy (i.e., completeness) of the traffic information and the signaling overhead according to the power consumption of the communication device, the user preference, the configuration set by a manufacturer of the communication device, the network configuration of the network, or any combination of the abovementioned description.

On the other hand, when transmitting the traffic information, the communication device can process the traffic information by using a function, and then transmits an output of the function to the network. Preferably, the function is one of a cumulative density function (CDF), a probability density function (PDF), a Fourier analysis, a Fourier transform and a Z-transform. For example, when the traffic information is processed by using the Fourier analysis, the Fourier transform or the Z-transform, frequency components can be used to describe a periodicity of the transmissions of the packets, and phase shifts can be used to describe time shifts of the transmissions of the packets. Besides, the function can also be used for processing the traffic information which is truncated and/or quantized as mentioned above.

Thus, as mentioned above, contents included in the traffic information and processing applied to the traffic information before transmitting the traffic information are not limited. Those skilled in the art should readily make alterations, modifications and/or combinations on the abovementioned description and examples.

According to the process 30, after receiving the traffic information, the network configures the transmission configuration of the communication device according to the traffic information. In detail, the transmission configuration may include a low-power mode configuration (e.g., discontinuous reception (DRX) operation) of the communication device. For example, the network may configure a starting time (or a timing offset) of the DRX operation, a period of the DRX operation, or switch between active connected modes and lower power modes. Alternatively, the transmission configuration comprises radio resource allocation of the communication device. For example, the network may configure uplink transmission opportunities, random access preamble (e.g., scheduled random access channel (RACH) procedure), opportunities to send a scheduling request (SR) or actual data scheduling (e.g., radio resource blocks, time slots, etc).

Please note that, when configuring the transmission configuration of the communication device, the network may simply configure the transmission configuration of the communication device in the network, or configure the transmission configuration of the communication device in the communication device. For example, the network can configure the transmission configuration by determining at least one parameter of the transmission configuration according to the traffic information first, wherein the at least one parameter can be related to the low-power mode configuration and/or the radio resource allocation, and is not limited. Then, the network transmits the at least one parameter to the communication device, to configure the at least one parameter of the transmission configuration in the communication device. That is, the network transmits the at least one parameter to the communication device, for the communication device to modify (e.g., update and/or adjust) the at least one parameter of the transmission configuration. Alternatively, the network can configure the transmission configuration by configuring at least one parameter of the transmission configuration in the network according to the traffic information. Furthermore, the network may configure the transmission configuration in both the network and the communication device, such that the network and the communication device can communicate with each other according to the same transmission configuration (e.g., using the same parameters).

On the other hand, a time instant at which the network configures the transmission configuration according to the traffic information is not limited. For example, the network can configure the transmission configuration according to the traffic information, when (e.g., upon) the network receives the traffic information. Alternatively, the network can configure the transmission configuration according to the traffic information, when a transition between a busy period and an idle period occurs at the communication device. For example, the network may configure the transmission configuration around (e.g., at) the time instants t1, t4, t5 and t8 as shown in FIG. 4. Methods for configuring the transmission configuration can be referred to the abovementioned description and examples, and are not narrated herein for simplicity.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling transmission configuration of a communication device in a wireless communication system. The network configures the transmission configuration according to traffic information transmitted by the communication device. Thus, power consumption and signaling overhead are reduced. As a result, battery life of the communication device and radio resources are saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling transmission configuration of a communication device in a wireless communication system, the method utilized in the communication device and comprising:
   recording traffic information of a plurality of packets which are transmitted between the communication device and a network of the wireless communication system according to the transmission configuration; and
   transmitting the traffic information to the network, for the network to configure the transmission configuration according to the traffic information, to manage power consumption of the communication device;
   wherein the traffic information comprises a periodicity and a plurality of timing offsets, and the plurality of packets are transmitted according to the periodicity and the plurality of timing offsets;
   wherein the traffic information comprises size information related to sizes of the plurality of packets;
   wherein the communication device performs at least one of a truncation and a quantization on the traffic information, before transmitting the traffic information to the network;
   wherein the network configures the transmission configuration according to the traffic information, when a transition between a busy period and an idle period occurs at the communication device.

2. The method of claim 1, wherein the plurality of packets are transmitted by at least one of the communication device and the network.

3. The method of claim 1, wherein the communication device transmits the traffic information to the network by:
   transmitting an index corresponding to the traffic information to the network.

4. The method of claim 1, wherein the communication device transmits the traffic information to the network by:
   processing the traffic information by using a function; and
   transmitting an output of the function to the network.

5. The method of claim 4, wherein the function is one of a cumulative density function (CDF), a probability density function (PDF), a Fourier analysis, a Fourier transform and a Z-transform.

6. The method of claim 1, wherein the transmission configuration comprises a low-power mode configuration of the communication device.

7. The method of claim 1, wherein the transmission configuration comprises radio resource allocation of the communication device.

8. The method of claim 1, wherein the network configures the transmission configuration according to the traffic information by:
   configuring at least one parameter of the transmission configuration in the network according to the traffic information.

9. The method of claim 1, wherein the network configures the transmission configuration according to the traffic information by:
   determining at least one parameter of the transmission configuration according to the traffic information; and
   transmitting the at least one parameter to the communication device, to configure the at least one parameter of the transmission configuration in the communication device.

10. The method of claim 1, wherein the network configures the transmission configuration according to the traffic information, when the network receives the traffic information.

11. A communication device in a wireless communication system for handling transmission configuration of the communication device, the communication device comprising:
   means for recording traffic information of a plurality of packets which are transmitted between the communication device and a network of the wireless communication system according to the transmission configuration; and
   means for transmitting the traffic information to the network, for the network to configure the transmission configuration according to the traffic information, to manage power consumption of the communication device;
   wherein the traffic information comprises a periodicity and a plurality of timing offsets, and the plurality of packets are transmitted according to the periodicity and the plurality of timing offsets;
   wherein the traffic information comprises size information related to sizes of the plurality of packets;
   wherein the communication device performs at least one of a truncation and a quantization on the traffic information, before transmitting the traffic information to the network;
   wherein the network configures the transmission configuration according to the traffic information, when a transition between a busy period and an idle period occurs at the communication device.

12. The communication device of claim 11, wherein the plurality of packets are transmitted by at least one of the communication device and the network.

13. The communication device of claim 11, wherein the communication device transmits the traffic information to the network by:
   transmitting an index corresponding to the traffic information to the network.

14. The communication device of claim 11, wherein the communication device transmits the traffic information to the network by:
   processing the traffic information by using a function; and
   transmitting an output of the function to the network.

15. The communication device of claim 14, wherein the function is one of a cumulative density function (CDF), a probability density function (PDF), a Fourier analysis, a Fourier transform and a Z-transform.

16. The communication device of claim 11, wherein the transmission configuration comprises a low-power mode configuration of the communication device.

17. The communication device of claim 11, wherein the transmission configuration comprises radio resource allocation of the communication device.

18. The communication device of claim 11, wherein the network configures the transmission configuration according to the traffic information by:
   configuring at least one parameter of the transmission configuration in the network according to the traffic information.

19. The communication device of claim 11, wherein the network configures the transmission configuration according to the traffic information by:
   determining at least one parameter of the transmission configuration according to the traffic information; and
   transmitting the at least one parameter to the communication device, to configure the at least one parameter of the transmission configuration in the communication device.

20. The communication device of claim 11, wherein the network configures the transmission configuration according to the traffic information, when the network receives the traffic information.

* * * * *